US011527748B2

(12) United States Patent
Hibino et al.

(10) Patent No.: US 11,527,748 B2
(45) Date of Patent: Dec. 13, 2022

(54) ELECTRODE, ELECTRODE ELEMENT, ELECTROCHEMICAL ELEMENT, AND METHOD FOR MANUFACTURING ELECTRODE

(71) Applicant: RICOH COMPANY, LTD., Tokyo (JP)

(72) Inventors: Eiko Hibino, Kanagawa (JP); Hiromichi Kuriyama, Kanagawa (JP); Satoshi Nakajima, Tokyo (JP); Shigeo Takeuchi, Kanagawa (JP); Toru Ushirogochi, Kanagawa (JP); Hideo Yanagita, Tokyo (JP); Keigo Takauji, Kanagawa (JP); Miku Ohkimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 336 days.

(21) Appl. No.: 16/751,249

(22) Filed: Jan. 24, 2020

(65) Prior Publication Data
US 2020/0243850 A1 Jul. 30, 2020

(30) Foreign Application Priority Data

Jan. 25, 2019 (JP) .............................. JP2019-011677
Nov. 26, 2019 (JP) .............................. JP2019-213644

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0402* (2013.01); *H01M 4/0471* (2013.01);
(Continued)

(58) Field of Classification Search
None
See application file for complete search history.

(56) References Cited

U.S. PATENT DOCUMENTS

2013/0288113 A1 10/2013 Onagi et al.
2014/0186696 A1 7/2014 Onagi et al.
(Continued)

FOREIGN PATENT DOCUMENTS

CN 104205465 12/2014
CN 105186006 12/2015
(Continued)

OTHER PUBLICATIONS

U.S. Appl. No. 16/490,323, filed Mar. 5, 2018, Masahiro Masuzawa, et al.
(Continued)

*Primary Examiner* — Tracy M Dove
(74) *Attorney, Agent, or Firm* — Grüneberg and Myers PLLC

(57) ABSTRACT

In accordance with some embodiments of the present invention, an electrode was provided. The electrode includes an electrode composite layer and a porous insulating layer on the electrode composite layer. The electrode composite layer contains an active material. A surface roughness Rz of the electrode composite layer is smaller than an average film thickness of the porous insulating layer.

11 Claims, 8 Drawing Sheets

| | POSITIVE ELECTRODE | | POROUS INSULATING LAYER ON POSITIVE ELECTRODE | | NEGATIVE ELECTRODE | | POROUS INSULATING LAYER ON NEGATIVE ELECTRODE | | CAPACITY RETENTION RATE |
|---|---|---|---|---|---|---|---|---|---|
| | TYPE | Rz μm | TYPE | AVERAGE FILM THICKNESS μm | TYPE | Rz μm | TYPE | AVERAGE FILM THICKNESS μm | % |
| EXAMPLE 1 | A | 8 | — | — | B | 1 | A | 3 | 95 |
| EXAMPLE 2 | A | 8 | — | — | A | 7 | A | 8 | 95 |
| COMPARATIVE EXAMPLE 1 | A | 8 | — | — | A | 7 | A | 5 | 70 |
| EXAMPLE 3 | A | 8 | — | — | B | 1 | B | 3 | 95 |
| EXAMPLE 4 | A | 8 | — | — | B | 1 | C | 3 | 95 |
| EXAMPLE 5 | B | 1.5 | A | 3 | B | 1 | A | 3 | 99 |

(51) Int. Cl.
*H01M 4/62* (2006.01)
*H01M 4/02* (2006.01)
*H01M 50/46* (2021.01)

(52) U.S. Cl.
CPC ............. *H01M 4/62* (2013.01); *H01M 50/46* (2021.01); *H01M 2004/021* (2013.01)

(56) References Cited

U.S. PATENT DOCUMENTS

| | | | |
|---|---|---|---|
| 2015/0017510 A1* | 1/2015 | Terado | H01M 50/446 429/246 |
| 2015/0249263 A1 | 9/2015 | Takeuchi et al. | |
| 2015/0287537 A1 | 10/2015 | Onagi et al. | |
| 2015/0303512 A1 | 10/2015 | Kimura et al. | |
| 2015/0303513 A1 | 10/2015 | Hirowatari et al. | |
| 2016/0181655 A1 | 6/2016 | Yanagita et al. | |
| 2016/0260972 A1 | 9/2016 | Hibino et al. | |
| 2017/0373338 A1* | 12/2017 | Teranishi | H01M 4/139 |
| 2018/0261827 A1 | 9/2018 | Yanagita et al. | |
| 2019/0288259 A1 | 9/2019 | Ohkimoto et al. | |
| 2019/0288276 A1 | 9/2019 | Utsuki et al. | |

FOREIGN PATENT DOCUMENTS

| | | |
|---|---|---|
| CN | 107004890 | 8/2017 |
| JP | 2009164014 | 7/2009 |
| JP | 2015176856 | 10/2015 |
| JP | 2016-181409 | 10/2016 |
| JP | 2018-147874 | 9/2018 |
| JP | 2019-061943 | 4/2019 |
| WO | WO2014/168019 A1 | 10/2014 |

OTHER PUBLICATIONS

Chinese Office Action dated Sep. 20, 2022, in Chinese Application No. 202010068632.7, 11 pages.

* cited by examiner

FIG. 9

| | POSITIVE ELECTRODE | | POROUS INSULATING LAYER ON POSITIVE ELECTRODE | | NEGATIVE ELECTRODE | | POROUS INSULATING LAYER ON NEGATIVE ELECTRODE | | CAPACITY RETENTION RATE |
|---|---|---|---|---|---|---|---|---|---|
| | TYPE | Rz μm | TYPE | AVERAGE FILM THICKNESS μm | TYPE | Rz μm | TYPE | AVERAGE FILM THICKNESS μm | % |
| EXAMPLE 1 | A | 8 | — | — | B | 1 | A | 3 | 95 |
| EXAMPLE 2 | A | 8 | — | — | A | 7 | A | 8 | 95 |
| COMPARATIVE EXAMPLE 1 | A | 8 | — | — | A | 7 | A | 5 | 70 |
| EXAMPLE 3 | A | 8 | — | — | B | 1 | B | 3 | 95 |
| EXAMPLE 4 | A | 8 | — | — | B | 1 | C | 3 | 95 |
| EXAMPLE 5 | B | 1.5 | A | 3 | B | 1 | A | 3 | 99 |

ELECTRODE, ELECTRODE ELEMENT, ELECTROCHEMICAL ELEMENT, AND METHOD FOR MANUFACTURING ELECTRODE

CROSS-REFERENCE TO RELATED APPLICATIONS

This patent application is based on and claims priority pursuant to 35 U.S.C. § 119(a) to Japanese Patent Application Nos. 2019-011677 and 2019-213644, filed on Jan. 25, 2019 and Nov. 26, 2019, respectively, in the Japan Patent Office, the entire disclosure of each of which is hereby incorporated by reference herein.

BACKGROUND

Technical Field

The present disclosure relates to an electrode, an electrode element, an electrochemical element, and a method for manufacturing an electrode.

Description of the Related Art

Electrochemical elements are known as primary batteries, secondary batteries, capacitors, and condensers. In recent years, the need for thin electrochemical elements to be mounted on various wearable devices and medical patches has been increasing.

The electrochemical element has a configuration in which electrodes are respectively arranged on both sides of an insulator. In primary batteries, secondary batteries, and capacitors, a positive electrode and a negative electrode are respectively disposed on both sides of an insulator having ion permeability. In condensers, two electric conductors are disposed via a dielectric body (insulator).

As the insulator disposed between the electrodes in primary batteries, secondary batteries, and capacitors, a stretched polyolefin film or a nonwoven fabric has been used. In recent attempts to improve safety, especially for lithium ion batteries with high energy density, a technique for providing on an electrode (e.g., negative electrode) a heat-resistant layer that comprises ceramic particles and a binder and that is unshrinkable even at high temperatures, as a separator, has been proposed. As an example, a technique for providing on the surface of an electrode having a ceramic separator layer a surface smoothing layer with a material different from the active material has been proposed.

SUMMARY

In accordance with some embodiments of the present invention, an electrode was provided. The electrode includes an electrode composite layer and a porous insulating layer on the electrode composite layer. The electrode composite layer contains an active material. A surface roughness Rz of the electrode composite layer is smaller than an average film thickness of the porous insulating layer.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is a table for explaining Examples and Comparative Example.

Figure 1:
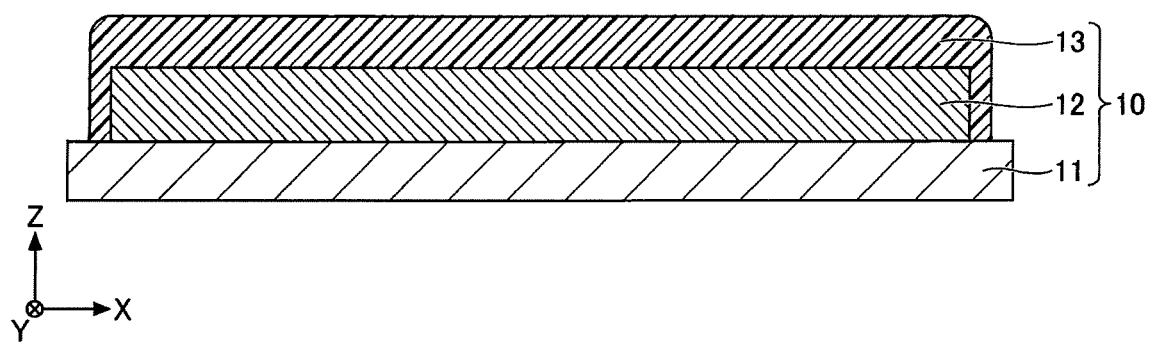
FIG. 1 is a cross-sectional view of a negative electrode used for an electrochemical element according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Provision of a surface smoothing layer with a material different from the active material on the surface of an electrode having a ceramic separator layer means addition of a new layer, which requires additional processes for preparing and applying a surface smoothing layer coating material.

In accordance with some embodiments of the present invention, an electrode having an electrode composite layer containing an active material and a porous insulating layer disposed on the electrode composite layer is provided that has improved insulation reliability without additional layer.

Embodiments of the present invention are described in detail below with reference to the drawings. In each drawing, the same reference numerals are given to the same components, and redundant explanation may be omitted.

FIG. 1 is a cross-sectional view of a negative electrode used for an electrochemical element according to an embodiment of the present invention. Referring to FIG. 1, a negative electrode 10 includes a negative electrode substrate 11, a negative electrode composite layer 12 formed on the negative electrode substrate 11, and a porous insulating layer 13 formed on the negative electrode composite layer 12. The shape of the negative electrode 10 is not particularly limited and can be suitably selected to suit to a particular application. For example, the negative electrode 10 may be in a flat-plate form.

In FIG. 1, a stack direction (i.e., thickness direction) of the negative electrode substrate 11 and the negative electrode composite layer 12 is defined as a Z direction, and directions orthogonal to each other in a plane orthogonal to the Z direction are defined as an X direction and a Y direction.

In the negative electrode 10, it is preferable that the porous insulating layer 13 be formed large enough to protrude from the negative electrode composite layer 12 for preventing short circuit. In this case, when viewed from the Z direction, the area of the porous insulating layer 13 is larger than the area of the negative electrode composite layer 12. For example, the porous insulating layer 13 can be formed so as to cover the upper surface and side surfaces of the negative electrode composite layer 12.

Figure 2:
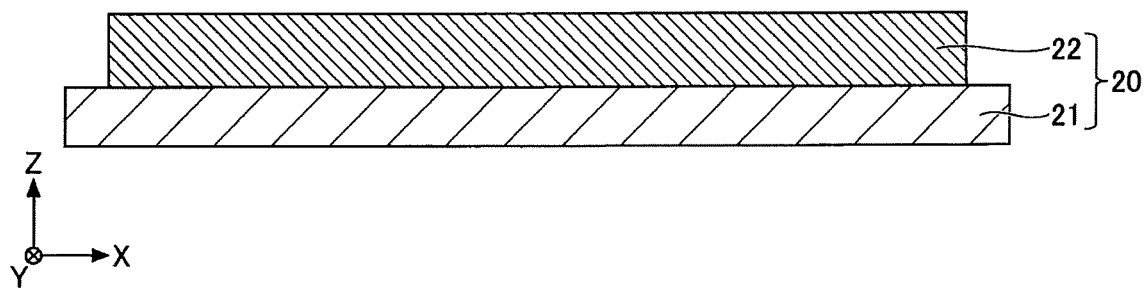
FIG. 2 is a cross-sectional view of a positive electrode used for an electrochemical element according to an embodiment of the present invention.

FIG. 2 is a cross-sectional view of a positive electrode used for an electrochemical element according to an embodiment of the present invention. Referring to FIG. 2, a positive electrode 20 includes a positive electrode substrate 21 and a positive electrode composite layer 22 formed on the positive electrode substrate 21. The shape of the positive electrode 20 is not particularly limited and can be suitably selected to suit to a particular application. For example, the positive electrode 20 may be in a flat-plate form.

Figure 3:
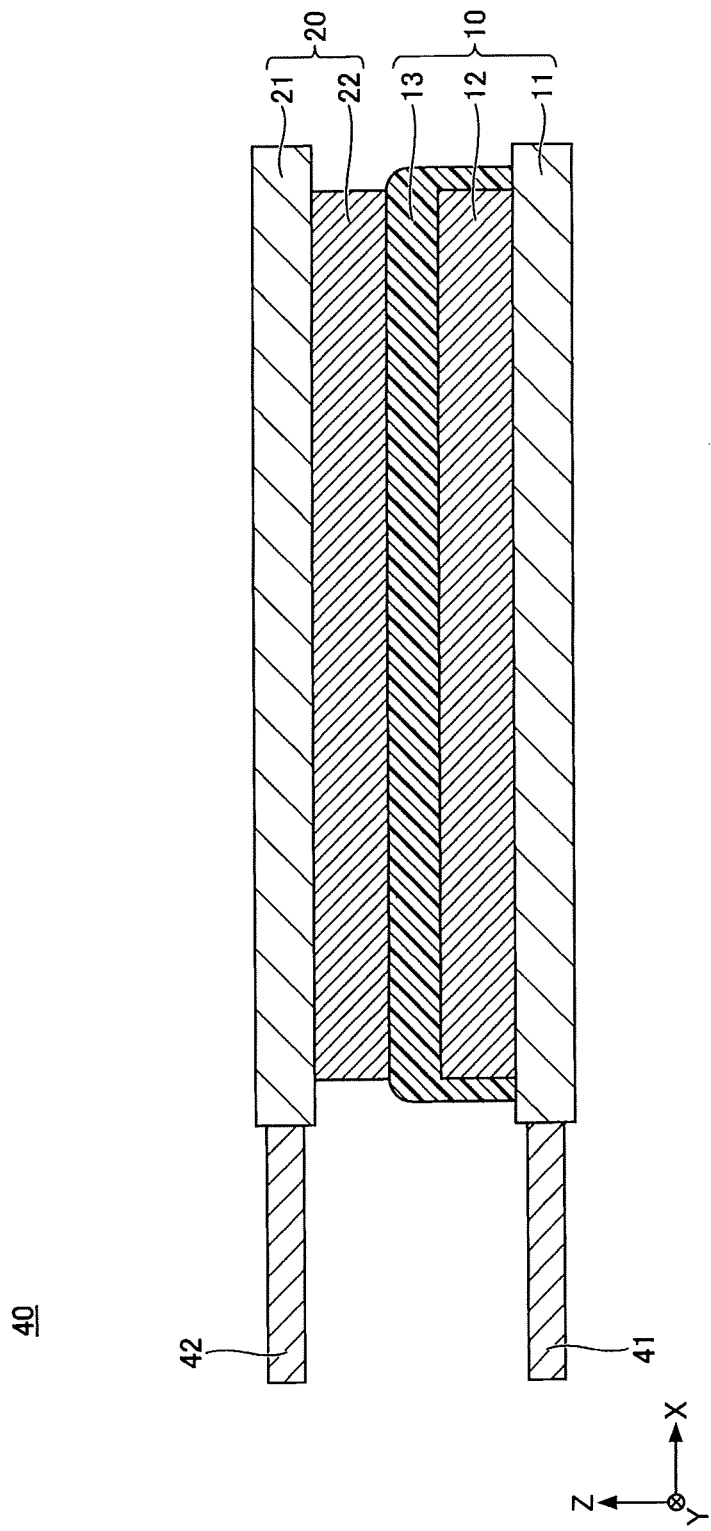
FIG. 3 is a cross-sectional view of an electrode element used for an electrochemical element according to an embodiment of the present invention.

FIG. 3 is a cross-sectional view of an electrode element used for an electrochemical element according to an embodiment of the present invention. Referring to FIG. 3, an electrode element 40 has a structure in which the negative electrode 10 and the positive electrode 20 are stacked with being insulated from each other. More specifically, the electrode element 40 has a structure in which the negative electrode 10 and the positive electrode 20 are stacked with the negative electrode substrate 11 and the positive electrode substrate 21 facing outward, and the negative electrode 10 and the positive electrode 20 are insulated from each other by the porous insulating layer 13. A negative electrode lead wire 41 is connected to the negative electrode substrate 11. A positive electrode lead wire 42 is connected to the positive electrode substrate 21.

FIG. 3 illustrates an example in which the porous insulating layer 13 is provided on the negative electrode composite layer 12 of the negative electrode 10. However, the present embodiment is not limited thereto, and a porous insulating layer may be provided on the positive electrode composite layer 22 of the positive electrode 20 without providing the porous insulating layer 13 to the negative electrode 10. Alternatively, the porous insulating layer 13 may be provided on the negative electrode composite layer 12 of the negative electrode 10 and another porous insulating layer may be further provided on the positive electrode composite layer 22 of the positive electrode 20.

That is, in the electrode element 40, at least one of the negative electrode composite layer and the positive electrode composite layer is covered with a porous insulating layer, and the negative electrode composite layer and the positive electrode composite layer are stacked so as to face each other via the porous insulating layer. Needless to say, both of the negative electrode composite layer and the positive electrode composite layer may be covered with a porous insulating layer. In this case, the possibility of poor insulation of the porous insulating layer can be further reduced.

The number of the negative electrode 10 and the positive electrode 20 stacked in the electrode element 40 can be arbitrarily determined. FIG. 3 illustrates an example in which one negative electrode 10 and one positive electrode 20, i.e., two layers in total, are stacked. However, the number of the stacked layers is not limited to this, and more negative electrodes 10 and positive electrodes 20 can be stacked with being insulated from each other. In such cases, the number of the negative electrodes 10 and the number of the positive electrodes 20 may be either the same or different.

Figure 4:
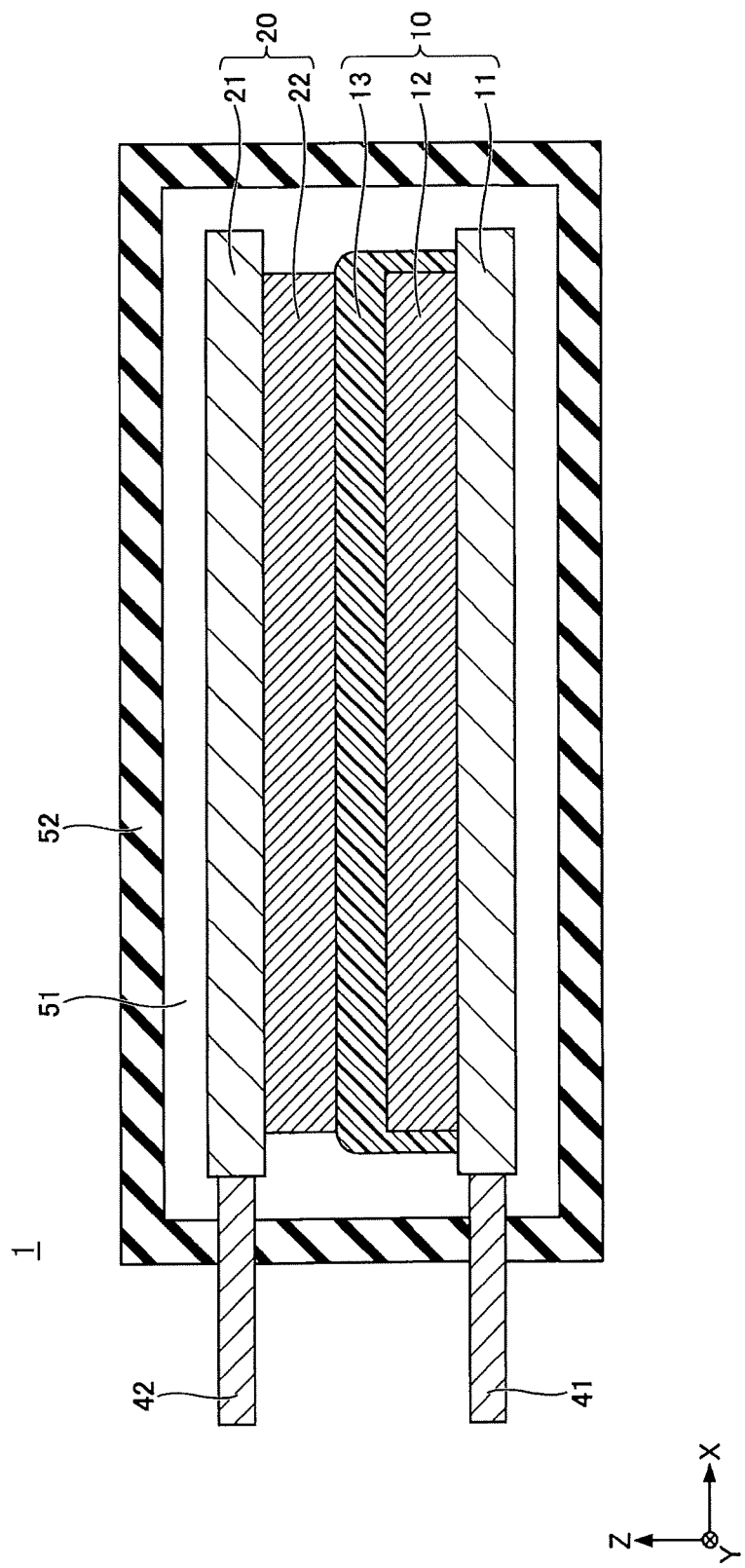
FIG. 4 is a cross-sectional view of an electrochemical element according to an embodiment of the present invention.

FIG. 4 is a cross-sectional view of an electrochemical element according to an embodiment of the present invention. Referring to FIG. 4, an electrochemical element 1 has a structure in which an electrolyte layer 51 is formed by injecting an aqueous electrolytic liquid or a non-aqueous electrolytic liquid into the electrode element 40 and sealed with an exterior 52. In the electrochemical element 1, the negative electrode lead wire 41 and the positive electrode lead wire 42 are drawn out of the exterior 52. The electrochemical element 1 may further include other members, as necessary. The electrochemical element 1 is not particularly limited and can be suitably selected to suit to a particular application. Examples thereof include, but are not limited to, primary batteries, secondary batteries, capacitors, and condensers.

Each of the primary batteries, secondary batteries, capacitors, and condensers has a configuration in which electrodes are respectively arranged on both sides of an insulator (e.g., porous insulating layer 13). In primary batteries, secondary batteries, and capacitors, a positive electrode and a negative electrode are respectively disposed on both sides of an insulator having ion permeability. In condensers, two electric conductors are disposed via a dielectric body (insulator).

The shape of the electrochemical element 1 is not particularly limited and can be suitably selected from various generally-employed shapes to suit to a particular application. For example, the shape may be of a laminate type, a cylinder type in which a sheet electrode and a separator are assembled in a spiral manner, another cylinder type in which a pellet electrode and a separator are combined into an inside-out structure, or a coin type in which a pellet electrode and a separator are laminated.

The electrochemical element 1 is described in detail below. In the following descriptions, the negative electrode and the positive electrode may be collectively referred to as "electrode", the negative electrode substrate and the positive electrode substrate may be collectively referred to as "electrode substrate", and the negative electrode composite layer and the positive electrode composite layer may be collectively referred to as "electrode composite layer".

Electrode

The electrode refers to a combined body of an electrode substrate, which is an electric conductor, with an electrode composite layer formed of an active material directly involved in electron transfer and, if necessary, a conductive auxiliary agent and/or a binder.

Electrode Substrate

The material of the negative electrode substrate 11 is not particularly limited and can be suitably selected to suit to a particular application as long as it is formed of a conductive material and is stable with respect to the applied potential. Examples thereof include, but are not limited to, stainless steel, nickel, aluminum, copper, and carbon. The shape of the negative electrode substrate 11 is not particularly limited and can be suitably selected to suit to a particular application, and may be sheet-like, plate-like, or mesh-like.

The material of the positive electrode substrate 21 is not particularly limited and can be suitably selected to suit to a particular application as long as it is formed of a conductive material and is stable with respect to the applied potential. Examples thereof include, but are not limited to, aluminum, titanium, and tantalum.

FIGS. 1 and 2 each illustrate an embodiment in which the electrode composite layer is formed on one side of the electrode substrate. In another embodiment, the electrode composite layer may be formed on both sides of the electrode substrate. In another embodiment, the electrode composite layer is formed on one side of the electrode substrate, an insulating layer such as a polymer film is formed on the back side, and a thermally-fusible insulating adhesive layer is formed on an uncoated portion of the side on which the electrode composite layer is formed. Alternatively, on a substrate of an integrated circuit that detects the voltage of the electrochemical element, a conductor layer made of copper, carbon, or the like, may be formed together as the electrode substrate.

Electrode Composite Layer

The electrode composite layer may be formed by applying a liquid composition in a slurry state or an ink state onto the electrode substrate, followed by drying. Here, the liquid composition may be prepared by mixing an active material with a binder, a thickener, a conducting auxiliary agent, a solvent, and the like. The method for applying the liquid composition onto the electrode substrate may be, for example, die coating, comma coating, spin coating, casting, micro gravure coating, gravure coating, bar coating, roll coating, wire bar coating, dip coating, slit coating, capillary coating, spray coating, nozzle coating, or various printing methods such as screen printing, flexo printing, offset printing, reverse printing, and inkjet printing. After the drying, pressurization may be performed by a roll presser or the like for improving the electrode density, the adhesion between the electrode substrate and the electrode composite layer or between the active materials in the electrode composite layer, and the surface flatness of the electrode composite layer.

Method for Manufacturing Electrode

Preparation of Negative Electrode and Positive Electrode

Figure 5:
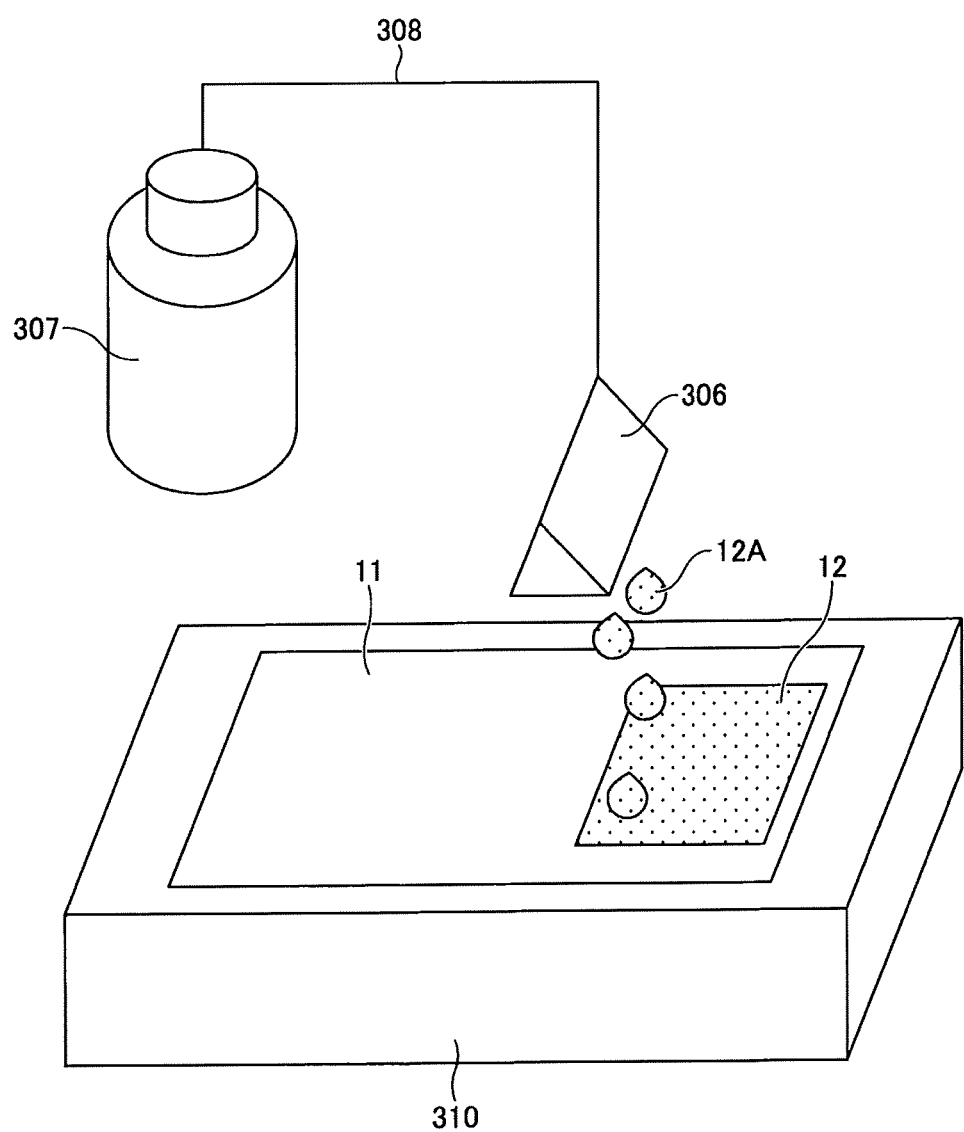
FIG. 5 is a diagram illustrating a method for manufacturing a negative electrode according to an embodiment of the present invention.

FIG. 5 is a diagram illustrating a method for manufacturing a negative electrode according to an embodiment of the present invention, for manufacturing the negative electrode 10 illustrated in FIG. 1. The method for manufacturing the negative electrode 10 includes a process of discharging a liquid composition according to an embodiment of the present invention onto the negative electrode substrate 11 by an inkjet method.

First, a liquid composition 12A for forming the negative electrode composite layer 12 is prepared, which contains a dispersion medium, a negative electrode material, and a binder, and optionally a conductive auxiliary agent and an electrode material dispersant. The liquid composition 12A is stored in a tank 307 and is supplied from the tank 307 to a liquid discharge mechanism 306 via a tube 308. The liquid discharge mechanism 306, the tank 307, and the tube 308 are resistant to the solvent used.

A portion of each of the liquid discharge mechanism 306, the tank 307, and the tube 308 where the liquid composition 12A passes through needs to have a diameter larger than the largest particle diameter of various electrode materials in the liquid composition 12A. When a portion of each of the liquid discharge mechanism 306, the tank 307, and the tube 308 where the liquid composition 12A passes through has a diameter larger than the largest particle diameter of various electrode materials in the liquid composition 12A, the liquid discharge mechanism 306, the tank 307, and the tube 308 are prevented from being clogged with the electrode materials in the liquid composition 12A and discharge stability is improved.

Figure 6:
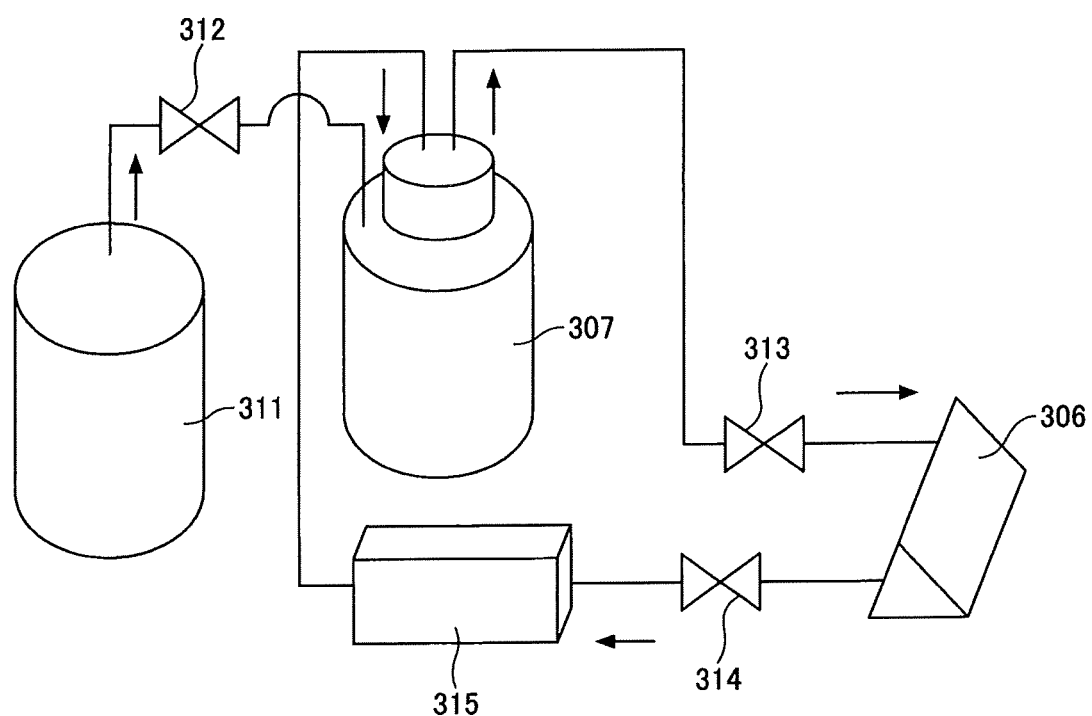
FIG. 6 is a diagram illustrating a device that circulates a liquid composition according to an embodiment of the present invention.

As illustrated in FIG. 6, a mechanism in which the liquid composition 12A circulates within a liquid discharging device may also be used. In FIG. 6, an external tank 311 is connected to the tank 307 via a valve 312, and the tank 307 is connected to the liquid discharge mechanism 306 via a valve 313. Further, the liquid discharge mechanism 306 is connected to a pump 315 via a valve 314, and the pump 315 is connected to the tank 307.

In FIG. 6, the pump 315 and the valves 313 and 314 are controlled to control the flow of the liquid composition 12A to make the liquid composition 12A stored in the tank 307 circulate within the liquid discharging device. With the configuration as illustrated in FIG. 6, particles are prevented from precipitating. Further, when the amount of the dischargeable liquid composition 12A is reduced, the valve 312 is controlled to make the liquid composition 12A supplied from the external tank 311 to the tank 307 disposed in the liquid discharging device.

A nozzle capping mechanism may be further provided to prevent the liquid discharge mechanism 306 from drying when the liquid composition 12A is not discharged therefrom. With such a configuration, a decrease in discharging performance due to nozzle drying can be prevented.

In preparing the negative electrode 10, as illustrated in FIG. 5, the negative electrode substrate 11 is placed on a stage 310 capable of heating, and then the liquid composition 12A is discharged onto the negative electrode substrate 11. At this time, the stage 310 may move, or the liquid discharge mechanism 306 may move.

The liquid composition 12A is discharged from the liquid discharge mechanism 306 onto the negative electrode substrate 11 placed on the stage 310 and heated by the stage 310 to be dried, thus becoming the negative electrode composite layer 12. Means for drying is not limited to heating on the stage 310, and a drying mechanism may be provided separately from the stage 310.

The drying mechanism is not particularly limited as long as it does not come into direct contact with the liquid composition 12A. Examples thereof include, but are not limited to, a resistance heater, an infrared heater, a fan heater, and a blower. Also, a plurality of drying mechanisms may be provided. The drying temperature must be lower than the melting temperature of the binder used and is preferably in the range of from 70 to 150 degrees C. for power consumption. Further, an ultraviolet emitter may be provided in the drying mechanism.

Figure 7:
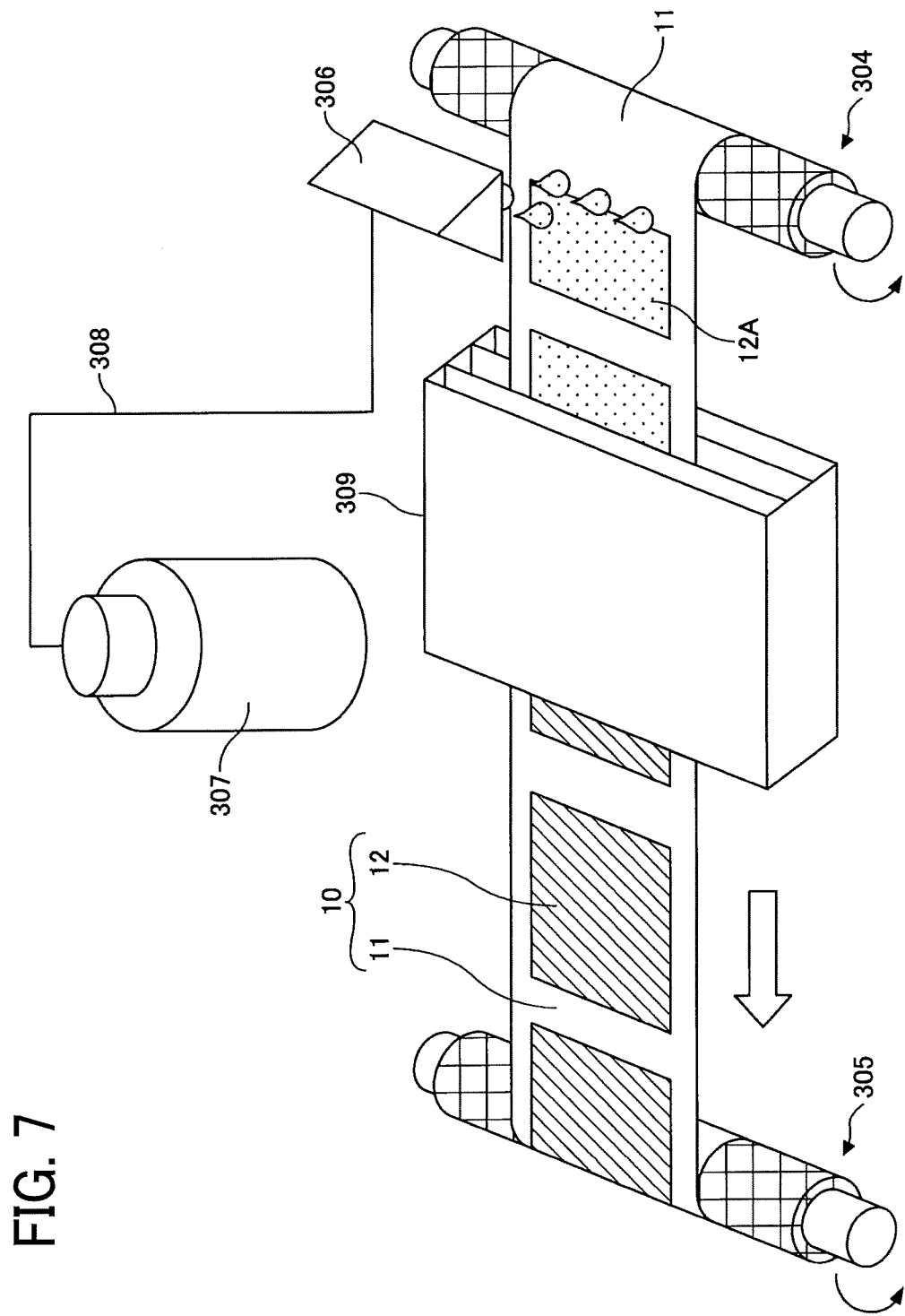
FIG. 7 is a diagram illustrating a method for manufacturing a negative electrode according to an embodiment of the present invention.

The negative electrode 10 may also be manufactured by a device illustrated in FIG. 7. FIG. 7 is a diagram illustrating another method for manufacturing a negative electrode according to an embodiment of the present invention, for manufacturing the negative electrode 10 illustrated in FIG. 1. First, the negative electrode substrate 11 in an elongated shape, as illustrated in FIG. 7, made of stainless steel, copper, or the like, is prepared. Next, the negative electrode substrate 11 is wound around a cylindrical core and set on a send-out roller 304 and a take-up roller 305 so that the side on which the negative electrode composite layer 12 is to be formed faces upward. The send-out roller 304 and the take-up roller 305 rotate counterclockwise to convey the negative electrode substrate 11 from right to left in FIG. 7.

Next, a liquid composition 12A in a slurry form for forming the negative electrode composite layer 12 is prepared, which contains a dispersion medium, a negative electrode material, and a binder, and optionally a conductive auxiliary agent and an electrode material dispersant. The liquid composition 12A thus prepared is stored in a tank 307 to be supplied from the tank 307 to a liquid discharge mechanism 306 via a tube 308. The liquid discharge mechanism 306 is disposed above the negative electrode substrate 11 between the send-out roller 304 and the take-up roller 305.

The liquid discharge mechanism 306 discharges the liquid composition 12A onto the negative electrode substrate 11 being conveyed. The liquid composition 12A is discharged so as to cover at least a part of the negative electrode substrate 11. A plurality of liquid discharge mechanisms 306 may be provided in a direction substantially parallel to or substantially perpendicular to the direction of conveyance of the negative electrode substrate 11.

The negative electrode substrate 11 partially coated with the liquid composition 12A is conveyed to a drying mechanism 309 by the send-out roller 304 and the take-up roller 305. As a result, the liquid composition 12A on the negative electrode substrate 11 is dried and formed into the negative electrode composite layer 12, thus forming the negative electrode 10 in which the negative electrode composite layer 12 is bonded to the negative electrode substrate 11. The negative electrode 10 is cut into a piece with a desired size by punching or the like processing.

The drying mechanism 309 is not particularly limited as long as it does not come into direct contact with the liquid composition 12A. Examples thereof include, but are not limited to, a resistance heater, an infrared heater, and a fan heater. The drying mechanism 309 may be disposed either above or below the negative electrode substrate 11. Also, a plurality of drying mechanisms 309 may be provided.

The inkjet method is able to apply an object to the targeted position of the lower layer, which is preferable. Moreover, the inkjet method is able to bond the top and bottom surfaces of the negative electrode substrate 11 and the negative electrode composite layer 12 that are in contact with each other, which is preferable. In addition, the ink jet method is able to make the film thickness of the negative electrode composite layer 12 uniform, which is preferable.

The positive electrode 20 illustrated in FIG. 2 may be prepared in the same manner as described above except for replacing the negative electrode substrate 11 with the positive electrode substrate 21 and replacing the liquid composition 12A for forming the negative electrode composite layer 12 with another liquid composition for forming the positive electrode composite layer 22.

The electrode composite layer is formed on the electrode substrate, and the porous insulating layer is formed on the electrode composite layer in at least one of the negative electrode and the positive electrode. The surface roughness Rz of the electrode composite layer is smaller than the average film thickness of the porous insulating layer.

The surface roughness Rz is a parameter defined in a height direction, i.e., the Z direction, called a maximum height that represents the sum of the highest part (maximum peak height: Rp) and the deepest part (maximum valley depth: Rv) in a roughness profile with a sampling length, measured by a roughness meter.

The film thickness of the porous insulating layer may be measured by observing a cross section of the porous insulating layer with a scanning electron microscope (SEM). The average film thickness may be determined by dividing the field of view at equal intervals, measuring the length of the perpendicular line drawn from each division point on the surface of the insulating layer to the surface of the composite layer, and averaging the measured values. The number of divisions is, for example, 10 or more.

The surface roughness Rz of the electrode composite layer is reduced as D50 of the active material particles contained in the electrode composite layer is reduced. D50 is the diameter that equally divides a particle size distribution into the larger half and the smaller half, and is also called as the median. D50 of the active material particles forming the electrode composite layer can be adjusted by adjusting the length of time for disintegrating the active material particles by a jet mill or the like.

As to the active material of a primary battery using an aqueous electrolytic liquid, the positive electrode active material may be manganese dioxide, silver oxide, nickel oxyhydroxide, or lead oxide, and the negative electrode active material may be zinc or magnesium. As to the active material of a primary battery using a non-aqueous electrolytic liquid, the positive electrode active material may be graphite fluoride, manganese dioxide, iron sulfide, or copper oxide, and the negative electrode active material may be lithium.

The positive electrode active material of a secondary battery is not particularly limited as long as it is a material capable of reversibly occluding and releasing alkali metal ions. Typically, alkali-metal-containing transition metal compounds may be used as the positive electrode active material. Examples of the alkali-metal-containing transition metal compounds include, but are not limited to, lithium-containing transition metal compounds such as a composite oxide comprising lithium and at least one element selected from the group consisting of cobalt, manganese, nickel, chromium, iron, and vanadium.

Specific examples of the positive electrode active material include, but are not limited to, lithium-containing transition metal oxides such as lithium cobalt oxide, lithium nickel oxide, and lithium manganese oxide; olivine-type lithium salts such as $LiFePO_4$; chalcogen compounds such as titanium disulfide and molybdenum disulfide; and manganese dioxide.

The lithium-containing transition metal oxide refers to a metal oxide containing lithium and a transition metal, or that in which a part of the transition metal therein is substituted with a different element. Examples of the different element include, but are not limited to, Na, Mg, Se, Y, Mn, Fe, Co, Ni, Cu, Zn, Al, Cr, Pb, Sb, and B. Among these, Mn, Al, Co, Ni, and Mg are preferred. One type or two or more types of different elements may be contained in the compound. Each of the above-described positive electrode active materials can be used alone or in combination with others. Examples of the active material for nickel hydrogen batteries include, but are not limited to, nickel hydroxide.

The negative electrode active material of a secondary battery is not particularly limited as long as it is a material capable of reversibly occluding and releasing alkali metal ions. Typically, carbon materials including graphite having a graphite-type crystal structure may be used as the negative electrode active material. Examples of such carbon materials include, but are not limited to, natural graphite, spherical or fibrous synthetic graphite, poorly-graphitizable carbon (hard carbon), and easily-graphitizable carbon (soft carbon). Other than the carbon materials, lithium titanate may also be used. For improving energy density of lithium ion batteries, high capacity materials such as silicon, tin, silicon alloy, tin alloy, silicon oxide, silicon nitride, and tin oxide can also be used as the negative electrode active material.

Examples of the negative electrode active material for nickel hydrogen batteries include, but are not limited to, hydrogen storage alloys, specifically $AB_2$-type or $A_2B$-type hydrogen storage alloys such as a Zr—Ti—Mn—Fe—Ag—V—Al—W alloy and a $Ti_{15}Zr_{21}V_{15}Ni_{29}Cr_5Co_5Fe_1Mn_8$ alloy. When an aqueous electrolytic liquid is used, the positive electrode active material may be nickel oxyhydroxide or lead dioxide, and the negative electrode active material may be cadmium, hydrogen storage alloy, or lead.

In an electric double layer capacitor, carbon materials such as activated carbon can be used as both the positive electrode active material and the negative electrode active material.

Porous Insulating Layer

The porous insulating layer 13 comprises at least one of a resinous porous insulating layer, a resin particle stacked body, and an insulating inorganic particle stacked body.

Here, the resin particle stacked body refers to a porous insulating layer formed by stacking resin particles. The insulating inorganic particle stacked body refers to a porous insulating layer formed by stacking insulating inorganic particles such as ceramic particles. Hereinafter, the insulating inorganic particle stacked body and the resin particle stacked body may be collectively referred to as the particle-stacked porous insulating layer.

Resinous Porous Insulating Layer

Figure 8A:
FIGS. 8A and 8B are schematic views illustrating a resinous porous insulating layer.
Figure 8B:
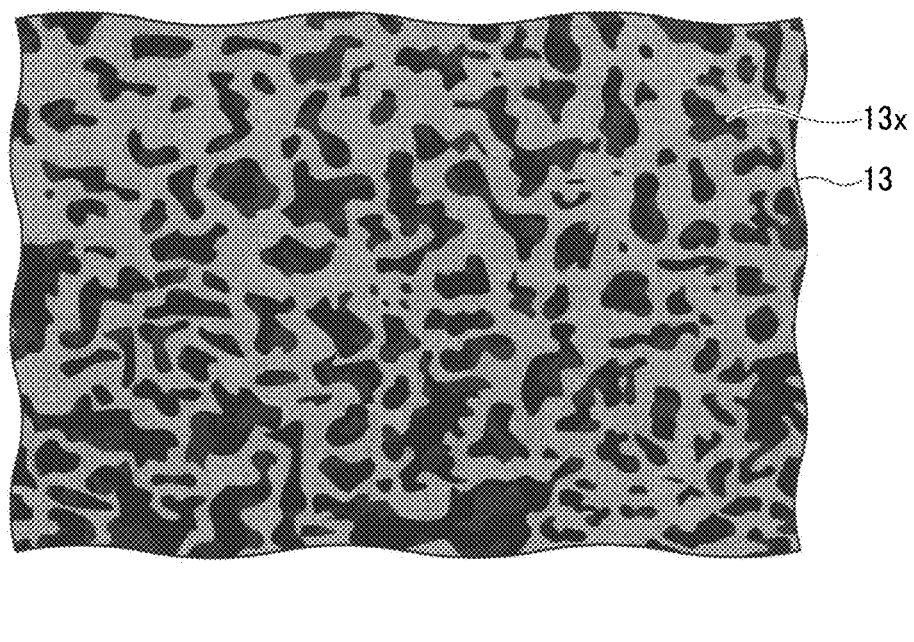

FIG. 8A is a schematic plan view of the resinous porous insulating layer viewed from a direction perpendicular to the XY plane (i.e., Z direction). FIG. 8B is a schematic cross-sectional view of the resinous porous insulating layer cut along the XZ plane.

The resinous porous insulating layer contains a resin as a main component and may have a cross-linked structure. Here, containing a resin as a main component refers to a state in which the resin occupies 50% by mass or more of all the materials constituting the resinous porous insulating layer.

The structure of the resinous porous insulating layer, that is, the insulating resin layer having a cross-linked structure, is not particularly limited. However, for secondary batteries only, the resinous porous insulating layer preferably has a bicontinuous structure having a three-dimensional branched network structure of a cured resin as the backbone, for ensuring electrolyte permeability and good ionic conductivity.

The resinous porous insulating layer has a large number of voids 13x. Preferably, the voids 13x are three-dimensionally spread with one void 13x communicated with other voids 13x around. As the voids are communicated, the electrolyte can easily penetrate the layer and inhibition of ion movement can be prevented.

The cross-sectional shape of the voids of the resinous porous insulating layer may be in various shapes, such as a substantially circular shape, a substantially elliptical shape, or a substantially polygonal shape, and in various sizes. Here, the size of the void refers to the length of the longest portion in the cross-sectional shape. The size of the void can be determined from a cross-sectional photograph taken with a scanning electron microscope (SEM).

The size of the void is not particularly limited. For secondary batteries only, the size of the void is preferably about 0.1 to 10 μm for electrolytic liquid permeability. A polymerizable compound is a precursor of a resin forming the porous structure and may be any resin capable of forming a cross-linked structure by irradiation with light or heat. Examples thereof include, but are not limited to, acrylate resins, methacrylate resins, urethane acrylate resins, vinyl ester resins, unsaturated polyesters, epoxy resins, oxetane resins, vinyl ethers, and resins utilizing an ene-thiol reaction. Among these, acrylate resins, methacrylate resins, urethane acrylate resins, and vinyl ester resins, which are able to easily form structures by radical polymerization due to their high reactivity, are preferred in terms of productivity.

The resin may be obtained by preparing a mixture of a polymerizable compound that is curable by light or heat and a compound that generates a radical or an acid by light or heat. To form the resinous porous insulating layer by polymerization-induced phase separation, a liquid composition in which the above-prepared mixture is mixed with a porogen in advance is to be prepared.

The polymerizable compound has at least one radical-polymerizable functional group. Examples thereof include, but are not limited to, monofunctional, difunctional, and trifunctional or higher radical-polymerizable compounds, functional monomers, and radical-polymerizable oligomers. Among these compounds, difunctional or higher radical-polymerizable compounds are preferred.

Specific examples of the monofunctional radical-polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these compounds can be used alone or in combination with others.

Specific examples of the difunctional radical-polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, neopentyl glycol diacrylate, and tricyclodecane dimethanol diacrylate. Each of these compounds can be used alone or in combination with others.

Specific examples of the trifunctional or higher radical-polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these compounds can be used alone or in combination with others.

Examples of photopolymerization initiators include photoradical generators. Examples thereof include photoradical polymerization initiators such as Michler's ketone and benzophenone known under the trade names IRGACURE and DAROCUR. Specific preferred examples thereof include, but are not limited to, benzophenone, acetophenone derivatives (e.g., α-hydroxy- or α-amino-acetophenone), 4-aroyl-1,3-dioxolane, benzyl ketal, 2,2-diethoxyacetophenone, p-dimethylaminoacetophene, p-dimethylaminopropiophenone, benzophenone, 2-chlorobenzophenone, pp'-dichlorobenzophene, pp'-bisdiethylaminobenzophenone, Michler's ketone, benzyl, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 2-hydroxy-2-methyl-1-phenyl-1-one, 1-(4-isopropylphenyl)-2-hydroxy-2-methylpropan-1-one, methyl benzoylformate, benzoin alkyl ethers and esters such as benzoin isopropyl ether, benzoin methyl ether, benzoin ethyl ether, benzoin ether, benzoin isobutyl ether, benzoin n-butyl ether, and benzoin n-propyl ether, 1-hydroxy-cyclohexyl-phenyl-ketone, 2-benzyl-2-dimethylamino-1-(4-morpholinophenyl)-butanone-1, 1-hydroxy-cyclohexyl-phenyl-ketone, 2,2-dim ethoxy-1,2-diphenylethan-1-one, bis(η5-2,4-cyclopentadien-1-yl)-bis(2,6-difluoro-3-(1H-pyrrol-1-yl)-phenyl)titanium, bis(2,4,6-trimethylbenzoyl)-phenylphosphine oxide, 2-methyl-1-[4-(methylthio)phenyl]-2-morpholinopropan-1-one, 2-hydroxy-2-methyl-1-phenyl-propan-1-one (DAROCUR 1173), bis(2,6-dimethoxybenzoyl)-2,4,4-trimethyl-pentylphosphine oxide, 1-[4-(2-hydroxyethoxy)-phenyl]-2-hydroxy-2-methyl-1-propan-1-one monoacylphosphine oxide, bisacylphosphine oxide or titanocene, fluorescein, anthraquinone, thioxanthone or xanthone, lophine dimer, trihalomethyl or dihalomethyl compounds, active ester compounds, and organic boron compounds.

Furthermore, a photo-cross-linkable radical generator such as a bisazide compound may be used in combination. In a case in which the polymerization is conducted under heat only, a typical thermal polymerization initiator such as azobisisobutyronitrile (AIBN) that is a typical photoradical generator can be used.

On the other hand, a mixture of a photoacid generator that generates an acid by irradiation with light and at least one monomer that is polymerizable in the presence of an acid achieves a similar function. When such a liquid composition is irradiated with light, the photoacid generator generates an acid, and this acid functions as a catalyst for a cross-linking reaction of the polymerizable compound.

The generated acid diffuses within the liquid composition. The acid diffusion and the acid-catalyzed cross-linking reaction can be accelerated by heating. This cross-linking reaction is not inhibited by the presence of oxygen, unlike radical polymerizations. The resulting resin layer has excellent adhesion property as compared with radical-polymerized resin layers.

Examples of the polymerizable compound cross-linkable in the presence of an acid include, but are not limited to, monomers having a cationically-polymerizable vinyl bond, such as compounds having a cyclic ether group such as epoxy group, oxetane group, and oxolane group, acrylic or vinyl compounds having the above-described substituent on a side chain, carbonate compounds, low-molecular-weight melamine compounds, vinyl ethers and vinylcarbazoles, styrene derivatives, α-methylstyrene derivatives, vinyl alcohol esters such as ester compounds of vinyl alcohols with acrylic acid or methacrylic acid, and combinations thereof.

Examples of the photoacid generator that generates an acid by irradiation with light include, but are not limited to, onium salts, diazonium salts, quinone diazide compounds, organic halides, aromatic sulfonate compounds, bisulfone compounds, sulfonyl compounds, sulfonate compounds, sulfonium compounds, sulfamide compounds, iodonium compounds, sulfonyl diazomethane compounds, and mixtures thereof.

Among these, onium salts are preferred as the photoacid generator. Examples of usable onium salts include, but are not limited to, diazonium salts, phosphonium salts, and sulfonium salts, each having a counter ion such as a fluoroborate anion, a hexafluoroantimonate anion, a hexafluoroarsenate anion, a trifluoromethanesulfonate anion, a p-toluenesulfonate anion, and a p-nitrotoluenesulfonate anion. Examples of the photoacid generator further include halogenated triazine compounds.

The photoacid generator may further contain a sensitizing dye. Examples of the sensitizing dye include, but are not limited to, acridine compounds, benzoflavins, perylene, anthracene, and laser dyes.

The porogen is mixed to form voids in the cured porous insulating layer. The porogen is arbitrarily selected from liquid substances capable of dissolving the polymerizable compound and the compound that generates a radical or an acid by light or heat and causing phase separation in the process in which the polymerizable compound and the compound that generates a radical or an acid by light or heat get polymerized.

Examples of the porogen include, but are not limited to: ethylene glycols such as diethylene glycol monomethyl ether, ethylene glycol monobutyl ether, and dipropylene glycol monomethyl ether; esters such as γ-butyrolactone and propylene carbonate; and amides such as N,N-dim ethyl acetamide.

In addition, liquid substances having a relatively large molecular weight, such as methyl tetradecanoate, methyl decanoate, methyl myristate, and tetradecane, also tend to function as the porogen. In particular, many ethylene glycols have a high boiling point. In the phase separation mechanism, the structure to be formed largely depends on the concentration of the porogen. When the above-described liquid substance is used, a porous insulating layer can be reliably formed. Each of the above-described porogens may be used alone or in combination with others.

Preferably, the liquid composition has a viscosity of from 1 to 150 mPa·s, more preferably from 5 to 20 mPa·s, at 25 degrees C. Further, the solid content concentration of the polymerizable compound in the liquid composition is preferably from 5% to 70% by mass, more preferably from 10% to 50% by mass. When the viscosity is in the above-described range, the liquid composition penetrates into the gaps between the active materials after discharge, so that the resinous porous insulating layer can be present inside the electrode composite layer.

When the concentration of the polymerizable compound is above the above-described range, the viscosity of the liquid composition increases, and it becomes difficult to form the porous insulating layer inside the active material. When the void is as small as several tens of nanometers or less, it is likely that the electrolyte hardly permeates. When the concentration of the polymerizable compound is below the above-described range, it is likely that a three-dimensional network structure is not sufficiently formed in the resin and the strength of the resulting porous insulating layer is remarkably lowered.

With respect the distribution of the resinous porous insulating layer, it is sufficient that the resinous porous insulating layer penetrates to the degree that improvement in adhesion is expected, and it is not necessary that the resinous porous insulating layer is present deep inside the electrode composite layer. There is a case in which the anchor effect is exhibited when the resinous porous insulating layer is sufficiently following the surface irregularities of the active materials and slightly penetrates into the gaps between the active materials. For this reason, although the optimum degree of penetration greatly depends on the material and shape of the active material, it is preferable that the resinous porous insulating layer be present 0.5% or more inside, more preferably 1.0% or more inside, in the depth direction (Z direction) from the surface of the electrode composite layer. The internal presence distribution can be appropriately adjusted according to the specification target of the electrochemical element.

The method for forming the resinous porous insulating layer is not particularly limited as long as it is formed with the liquid composition. Examples thereof include, but are not limited to, die coating, comma coating, spin coating, casting, micro gravure coating, gravure coating, bar coating, roll coating, wire bar coating, dip coating, slit coating, capillary coating, spray coating, nozzle coating, and various printing methods such as screen printing, flexo printing, offset printing, reverse printing, and inkjet printing.

Particle-Stacked Porous Insulating Layer

The particle-stacked porous insulating layer may be formed by stacking insulating inorganic particles or resin particles of appropriate size. As described above, the particle-stacked porous insulating layer collectively refers to the insulating inorganic particle stacked body and the resin particle stacked body.

In the insulating inorganic particle stacked body, the material constituting the insulating inorganic particle is not particularly limited and may be appropriately selected. Examples thereof include, but are not limited to, metal oxides, metal nitrides, metal compounds other than metal oxides and metal nitrides, and glass ceramics. Each of these insulating inorganic particles may be used alone or in combination with others.

Examples of the metal oxides include, but are not limited to, $Al_2O_3$ (alumina), $TiO_2$, $BaTiO_3$, and $ZrO_2$. Examples of the metal nitrides include, but are not limited to, aluminum nitride and silicon nitride. Examples of the metal compounds other than metal oxides and metal nitrides include, but are not limited to, poorly-soluble ionic crystals such as aluminum fluoride, calcium fluoride, barium fluoride, and barium sulfate; and substances derived from mineral resources such as boehmite, zeolite, apatite, kaolin, mullite, spinel, olivine, sericite, and bentonite, and artifacts thereof.

Examples of the glass ceramics include, but are not limited to, crystallized glass ceramics using $ZnO$—$MgO$—$Al_2O_3$—$SiO_2$-based crystallized glass, and non-glass ceramics using $BaO$—$Al_2O_3$—$SiO_2$-based ceramic or $Al_2O_3$—$CaO$—$SiO_2$—$MgO$—$B_2O_3$-based ceramic.

In the resin particle stacked body, examples of the material constituting the resin particles include, but are not limited to, polyethylene (PE), modified polyethylene, polypropylene, paraffin, copolymerized polyolefin, polyolefin derivatives (e.g., chlorinated polyethylene, polyvinylidene chloride, polyvinyl chloride, fluororesin), polyolefin wax, petroleum wax, and carnauba wax.

Examples of the copolymerized polyolefin include, but are not limited to, ethylene-vinyl monomer copolymers such as ethylene-propylene copolymer, ethylene-vinyl acetate copolymer (EVA), ethylene-methyl acrylate copolymer, ethylene-acrylic acid copolymer, ethylene-methacrylic acid copolymer, and ethylene-vinyl alcohol copolymer. These resins constituting the resin particles may be used alone or in combination with others.

The resin particles may be surface-modified. In this case, dispersibility of the resin particles in the liquid composition used to form the porous insulating layer can be improved. Surface modification of the resin particles may be conducted by, for example, introducing a polar group such as an alkoxy group, amide group, carboxyl group, and sulfonate group to the surface by utilizing a reactive group such as an ethylenic unsaturated group and epoxy group.

The average particle diameter of the insulating inorganic particles or resin particles is not particularly limited and may be appropriately selected according to the size of the void of the electrode composite layer, but it is preferably 10 μm or less, more preferably 3 μm or less.

The particle-stacked porous insulating layer may be formed by preparing an insulating layer forming liquid composition by mixing the insulating inorganic particles or resin particles and a dispersion medium, optionally with a binder, a dispersant, or the like, and applying the liquid composition onto the electrode composite layer by die coating, comma coating, spin coating, casting, micro gravure coating, gravure coating, bar coating, roll coating, wire bar coating, dip coating, slit coating, capillary coating, spray coating, nozzle coating, or various printing methods such as screen printing, flexo printing, offset printing, reverse printing, and inkjet printing.

The dispersion medium is not particularly limited and can be appropriately selected as long as it is capable of dispersing the insulating inorganic particles or resin particles. Examples thereof include, but are not limited to, water, hydrocarbon solvents, alcohol solvents, ketone solvents, ester solvents, ether solvents, 1-methyl-2-pyrrolidone, β-methoxy-N,N-dimethylpropionamide, and dimethyl sulfoxide.

Method for Forming Porous Insulating Layer

The porous insulating layer may be formed on an electrode by, for example, applying a liquid composition for forming a resinous porous insulating layer or particle-stacked body onto the electrode, using any of the apparatuses illustrated in FIGS. 5 to 7 that are used to manufacture electrodes.

Electrolytic Liquid

The electrolytic liquid component included in the electrolyte layer 51 may be either a solution of an electrolyte salt dissolved in a solvent or a liquid electrolyte such as an ionic liquid. Examples of the material of the electrolyte salt include, but are not limited to, inorganic ion salts (e.g., alkali metal salts and alkali-earth metal salts), quaternary ammonium salts, and supporting salts of acids and bases. Specific examples thereof include, but are not limited to, $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, and $Mg(BF_4)_2$.

Specific examples of the solvent that dissolves the electrolyte salt include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

In addition, ionic liquids containing these cationic components and anionic components can also be used.

The ionic liquids are not particularly limited, and all ionic liquids having been generally researched or reported can be used. Some organic ionic liquids exhibit liquidity in a wide temperature range including room temperature and comprise a cationic component and an anionic component.

Specific examples of cationic component include, but are not limited to, imidazole derivatives (e.g., N,N-dimethylimidazole salt, N,N-methylethylimidazole salt, N,N-methylpropylimidazole salt), aromatic salts of pyridinium derivatives (e.g., N,N-dimethylpyridinium salt, N,N-methylpropylpyridinium salt), and aliphatic quaternary ammonium compounds such as tetraalkylammonium compounds (e.g., trimethylpropylammonium salt, trimethylhexylammonium salt, triethylhexylammonium salt).

For stability in the atmosphere, specific preferred examples of the anionic component include, but are not limited to, fluorine-containing compounds such as $BF_4^-$, $CF_3SO_3^-$, $PF_4^-$, $(CF_3SO_2)_2N^-$, $B(CN)_4^-$.

The proportion of the electrolyte salt in a non-aqueous solvent is not particularly limited and can be suitably selected to suit to a particular application, but is preferably from 0.7 to 4 mol/L, more preferably from 1.0 to 3 mol/L, and particularly preferably from 1.0 to 2.5 mol/L, for achieving a good balance between the capacity and the output of the electrochemical element.

Further, a solid electrolyte may be used in place of the electrolytic liquid. Examples of solid electrolyte particles that can be used as the solid electrolyte include, but are not limited to, sulfide-based amorphous solid electrolyte particles, oxide-based amorphous solid electrolyte particles, and crystalline oxides.

In at least one of the negative electrode and the positive electrode in the electrochemical element according to an embodiment of the present invention, the porous insulating layer is provided on the electrode composite layer. The surface roughness Rz of the electrode composite layer is smaller than the average film thickness of the porous insulating layer. This configuration makes it possible to improve insulation reliability of the porous insulating layer without additional layer. As a result, the possibility of a partial short circuit between the positive electrode and the negative electrode in the electrochemical element is reduced and the capacity retention rate is improved.

Further understanding can be obtained by reference to certain specific examples of the electrochemical elements, etc. which are provided herein for the purpose of illustration only and are not intended to be limiting.

[1] Preparation of Negative Electrode

As a negative electrode active material, lithium titanate available from Ishihara Sangyo Kaisha, Ltd. was used. Two types of negative electrodes A and B were prepared using two types of liquid compositions A and B respectively containing the negative electrode active material in a secondary particle state having a D50 of 7 μm and that in a particle state having a D50 of 0.6 μm. The negative electrode active material in a particle state was obtained by disintegrating that in a secondary particle state. To each liquid composition, 4 parts by weight of acetylene black manufactured by Denka Company Limited were added as a conductive auxiliary agent per 100 parts by weight of the active material.

To the liquid composition A containing the active material having a D50 of 7 μm, 3 parts by weight of a fluoroacrylic binder TRD202A manufactured by JSR Corporation as a binder, 1 part by weight of carboxymethyl cellulose 2200 manufactured by Daicel Corporation as a thickener, and 100 parts by weight of water as a dispersion medium, each per 100 parts by weight of the active material, were further added. The liquid composition was applied onto an aluminum foil having a thickness of 20 μm with a table coater using a doctor blade and dried at 120 degrees C. for 5 minutes. Thus, a negative electrode A was prepared.

To the liquid composition B containing the active material having a D50 of 0.6 μm, 4 parts by weight of a fluoroacrylic binder TRD202A manufactured by JSR Corporation as a binder and 280 parts by weight of a mixture of water and propylene glycol (mixed at a weight ratio of 7:3) as a dispersion medium, each per 100 parts by weight of the active material, were further added. The liquid composition was discharged onto an aluminum foil having a thickness of 20 μm with an inkjet apparatus EV2500 manufactured by Ricoh Co., Ltd. and dried at 120 degrees C. for 5 minutes. Thus, a negative electrode B was prepared.

[2] Preparation of Positive Electrode

Preparation of Positive Electrode Active Material

Vanadium pentoxide, lithium hydroxide, phosphoric acid, sucrose, and water were mixed to form a precipitate. The precipitate was then pulverized to obtain a precursor slurry of vanadium phosphate particles. The precursor of vanadium phosphate was spray-dried with a spray dryer and then burnt at 900 degrees C. in a nitrogen atmosphere. Thus, vanadium phosphate particles having a D50 of 8 μm and a carbon content of 3% by mass were prepared. These particles were in a state of secondary particles in which primary particles were agglomerated. The secondary particles were disintegrated by a jet mill, thus obtaining vanadium phosphate particles having a D50 of 0.7 μm and a carbon content of 3% by mass.

Preparation of Positive Electrode

Two types of positive electrodes A and B were prepared using two types of liquid compositions A and B for forming a positive electrode composite layer containing the vanadium phosphate particles both having a carbon content of 3% by mass and respectively having a D50 of 8 μm and 0.7 μm. To each liquid composition, 1 part by weight of acetylene black manufactured by Denka Company Limited was added as a conductive auxiliary agent per 100 parts by weight of the active material.

To the liquid composition A containing the active material having a D50 of 8 μm, 3 parts by weight of a fluoroacrylic binder TRD202A manufactured by JSR Corporation as a binder, 1 part by weight of carboxymethyl cellulose 2200 manufactured by Daicel Corporation as a thickener, and 100 parts by weight of water as a dispersion medium, each per 100 parts by weight of the active material, were further added. The liquid composition was applied onto an aluminum foil having a thickness of 20 μm with a table coater using a doctor blade and dried at 120 degrees C. for 5 minutes. Thus, a positive electrode A was prepared. To the liquid composition B containing the active material having a D50 of 0.7 μm, 4 parts by weight of a fluoroacrylic binder TRD202A manufactured by JSR Corporation as a binder and 280 parts by weight of a mixture of water and propylene glycol (mixed at a weight ratio of 7:3) as a dispersion medium, each per 100 parts by weight of the active material, were further added. The liquid composition was discharged onto an aluminum foil having a thickness of 20 μm with an inkjet apparatus EV2500 manufactured by Ricoh Co., Ltd. and dried at 120 degrees C. for 5 minutes. Thus, a positive electrode B was prepared.

[3] Surface Roughness Measurement

The surface roughness of the electrode was measured with a confocal laser microscope, and the maximum roughness Rz of the surface of the electrode was determined.

[4] Preparation of Porous Insulating Layer

A resinous porous insulating layer or particle-stacked porous insulating layer was formed on the surface of the positive electrode composite layer or the negative electrode composite layer, or on the surfaces of both the positive electrode composite layer and the negative electrode composite layer.

Resinous Porous Insulating Layer

The below-listed materials were mixed in the proportions shown below to prepare a liquid composition for a resinous porous insulating layer.

Tricyclodecane dimethanol diacrylate (manufactured by DAICEL-ALLNEX LTD.): 29 parts by mass Tetradecane (manufactured by Kanto Chemical Co., Inc.): 70 parts by mass IRGACURE 184 (manufactured by BASF SE, a photoradical generator): 1 part by mass The prepared liquid composition was discharged onto the electrode composite layer by an inkjet apparatus EV2500 manufactured by Ricoh Co., Ltd. so as to have a predetermined thickness. As illustrated in FIG. 1, the liquid composition was discharged so as to form the resinous porous insulating layer larger than the electrode composite layer to cover the entire electrode composite layer. The liquid composition was thereafter cured by irradiation with ultraviolet rays in a nitrogen atmosphere, then heated at 120 degrees C. for 1 minute to remove the solvent as a porogen. Thus, an electrode having a porous insulating layer A was prepared. The average film thickness of the porous insulating layer was determined from a cross-sectional SEM photograph.

Particle-Stacked Porous Insulating Layer

A liquid composition for a particle-stacked porous insulating layer was prepared by mixing 20 parts by mass of alumina particles AA-05 (manufactured by Sumitomo Chemical Co., Ltd.), 0.3 parts by mass of a fluoroacrylic binder TRD202A (manufactured by JSR Corporation), 0.2 parts by mass of MALIALIM HKM-50A (manufactured by NOF CORPORATION), 30 parts by mass of isopropyl glycol, and 49.5 parts by mass of water.

The prepared liquid composition was discharged onto the electrode composite layer by an inkjet apparatus EV2500 manufactured by Ricoh Co., Ltd., while adjusting the droplet size, to be formed into a uniform liquid film having a predetermined thickness with 2400×2400 dpi pixels. As illustrated in FIG. 1, the liquid composition was discharged so as to form the particle-stacked porous insulating layer larger than the electrode composite layer to cover the entire electrode composite layer. The resultant was then heated at 120 degrees C. for 5 minutes. Thus, an electrode having a porous insulating layer B was prepared.

In addition, a liquid composition containing highly crosslinked polymethylmethacrylate resin particles (PMMA) in place of the alumina particles was prepared, discharged by the inkjet apparatus, and dried. Thus, an electrode having a porous insulating layer C was prepared. The average film thickness of the porous insulating layer was determined from a cross-sectional SEM photograph.

[5] Preparation of Electrochemical Element

As illustrated in FIG. 3, lead wires were joined to the respective electrode substrates of the negative electrode and the positive electrode by welding, thus preparing an electrode element. A non-aqueous electrolytic liquid containing 1.5 M $LiPF_6$ in a mixed solvent of EC and DMC (EC:DMC=1:1) was then injected into the electrode element and sealed with a laminate exterior material. Thus, a non-aqueous electrolyte electrochemical element was prepared.

[6] Evaluation

The non-aqueous electrolyte electrochemical element was subjected to 10 cycles of charge-discharge operations at 1 C (i.e., current value that can be discharged in 1 hour), then a discharge capacity (1) was measured. The non-aqueous electrolyte electrochemical element in a charged state after the 10 cycles of charge-discharge operations was left for 5 days and thereafter subjected to a discharge operation, then a discharge capacity (2) was measured. The discharge capacities (1) and (2) were compared to determine a capacity retention rate (i.e., discharge capacity (2)/discharge capacity (1)). In a case in which the insulating property of the porous insulating layer is poor, the positive electrode and the negative electrode are partially short-circuited, and the capacity retention rate is reduced.

Example 1

In Example 1, an electrochemical element was prepared using the positive electrode A provided with no porous insulating layer and the negative electrode B provided with the porous insulating layer A.

Example 2

In Example 2, an electrochemical element was prepared using the positive electrode A provided with no porous insulating layer and the negative electrode A provided with the porous insulating layer A.

Comparative Example 1

In Comparative Example 1, an electrochemical element was prepared using the positive electrode A provided with no porous insulating layer and the negative electrode A provided with the porous insulating layer A. Note that the average film thickness of the porous insulating layer A was made smaller than that in Example 2.

Example 3

In Example 3, an electrochemical element was prepared using the positive electrode A provided with no porous insulating layer and the negative electrode B provided with the porous insulating layer B.

Example 4

In Example 4, an electrochemical element was prepared using the positive electrode A provided with no porous insulating layer and the negative electrode B provided with the porous insulating layer C.

Example 5

In Example 5, an electrochemical element was prepared using the positive electrode B provided with the porous insulating layer A and the negative electrode B provided with the porous insulating layer A.

Summary of Results

The configurations and evaluation results of Examples 1 to 5 and Comparative Example 1 are presented in FIG. 9. As presented in FIG. 9, when the surface roughness Rz of the electrode composite layer is smaller than the average film thickness of the porous insulating layer as in Examples 1 to 5, the capacity retention rate is high. When the surface roughness Rz of the electrode composite layer is smaller than the average film thickness of the porous insulating layer, the insulating property of the porous insulating layer is good, so that the negative electrode and the positive electrode do not short-circuit, and the capacity retention rate is high.

By contrast, when the surface roughness Rz of the electrode composite layer is larger than the average film thickness of the porous insulating layer as in Comparative Example 1, the capacity retention rate is low. When the surface roughness Rz of the electrode composite layer is larger than the average film thickness of the porous insulating layer, the insulating property of the porous insulating layer is poor, so that the positive electrode and the negative electrode partially short-circuit, and the capacity retention rate is low.

It is preferable that the D50 of the active material particles forming the electrode composite layer be 5 μm or less for reducing the surface roughness Rz of the electrode composite layer. It is more preferable that the D50 of the active material particles forming the electrode composite layer be 1 μm or less for further reducing the surface roughness Rz of the electrode composite layer. As the surface roughness Rz of the electrode composite layer decreases, the degree of freedom in designing the film thickness of the porous insulating layer increases. It is also possible to reduce D50 of the active material particles to reduce the average film thickness of the porous insulating layer.

The preferred embodiments have been described in detail above. However, the present invention is not limited to the above-described embodiments, and various modifications and substitutions can be made to the above-described embodiments without departing from the scope of the claims.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrode, comprising:
an electrode composite layer comprising an active material; and
a porous insulating layer on the electrode composite layer,
wherein a surface roughness Rz of the electrode composite layer is smaller than an average film thickness of the porous insulating layer,
wherein the porous insulating layer has a bicontinuous structure which has a resinous backbone comprising a resin formed by polymerizing one or more radical-polymerizable compounds selected from the group consisting of 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, neopentyl glycol diacrylate, tricyclodecane dimethanol diacrylate, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate.

2. The electrode according to claim 1, wherein the active material comprises active material particles having a D50 of 5 μm or less.

3. The electrode according to claim 1, wherein an area of the porous insulating layer is larger than an area of the electrode composite layer when viewed from a stack direction of the porous insulating layer.

4. An electrode element, comprising:
a positive electrode; and
a negative electrode,
wherein at least one of the positive electrode and the negative electrode is the electrode according to claim 1.

5. An electrode element, comprising:
a positive electrode; and
a negative electrode,
wherein each of the positive electrode and the negative electrode is an electrode according to claim 1.

6. An electrochemical element, comprising:
the electrode element according to claim 4;
an electrolytic liquid injected into the electrode element; and
an exterior sealing the electrode element and the electrolytic liquid.

7. A method for manufacturing an electrode, comprising:
forming an electrode composite layer, comprising:
discharging a first liquid composition comprising an active material and a first dispersion medium; and
drying the discharged first liquid composition; and
forming a porous insulating layer having a bicontinuous structure on the electrode composite layer, comprising:
discharging a second liquid composition comprising a polymerizable compound selected from one or more of the group consisting of 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, neopentyl glycol diacrylate, and tricyclodecane dimethanol diacrylate, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate, and a second dispersion medium; and drying the discharged second liquid composition.

8. An electrode according to claim 1, wherein the electrode composite layer is a negative electrode composite layer.

9. An electrode according to claim 1, wherein the electrode composite layer is a positive electrode composite layer.

10. An electrode according to claim 1, wherein the bicontinuous structure has a resinous three-dimensional branched network structure as a backbone.

11. An electrode according to claim 1, wherein the porous insulating layer comprises a resin formed from tricyclodecane dimethanol diacrylate.

* * * * *